Figure 11:
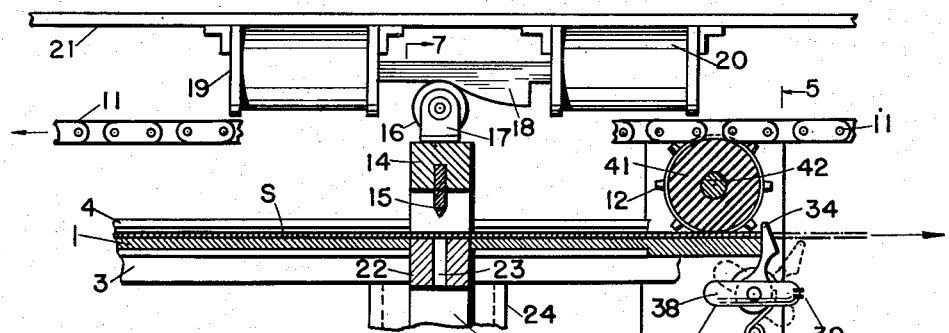

Dec. 22, 1953     T. A. PATTY     2,663,019
SHEET ASSEMBLING MACHINE
Filed Aug. 29, 1952     7 Sheets-Sheet 1
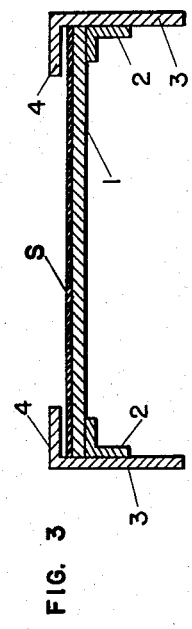
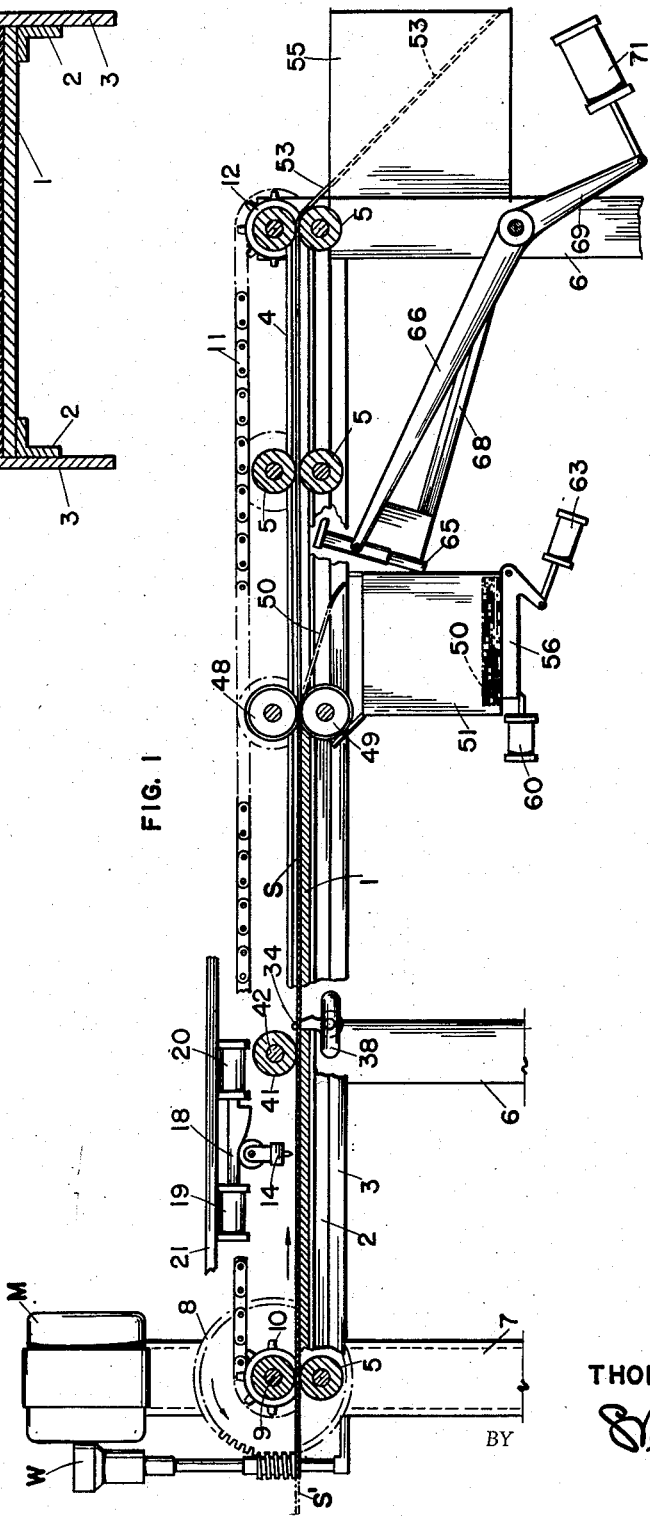
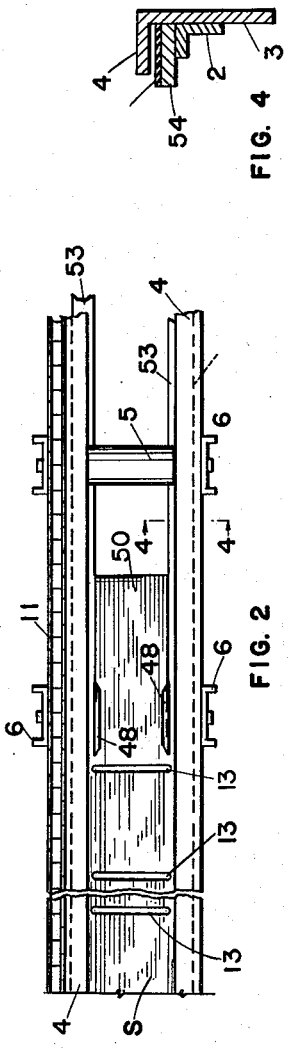
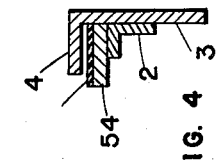
INVENTOR
THOMAS A. PATTY
BY *Stewart Blackman*
ATTORNEY Dec. 22, 1953 T. A. PATTY 2,663,019
SHEET ASSEMBLING MACHINE
Filed Aug. 29, 1952 7 Sheets-Sheet 2

INVENTOR
THOMAS A. PATTY
BY Stewart Blackman
ATTORNEY

Dec. 22, 1953  T. A. PATTY  2,663,019
SHEET ASSEMBLING MACHINE
Filed Aug. 29, 1952  7 Sheets-Sheet 3
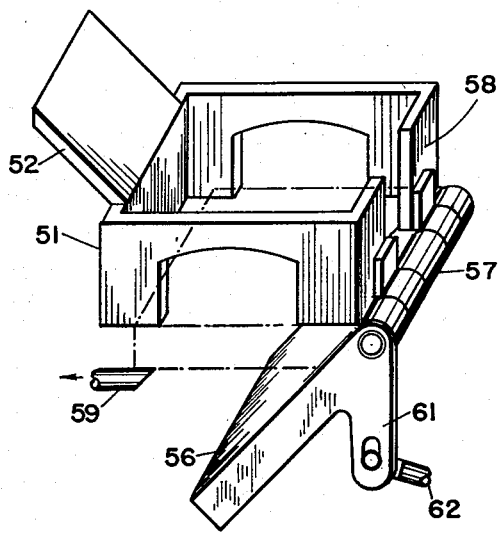
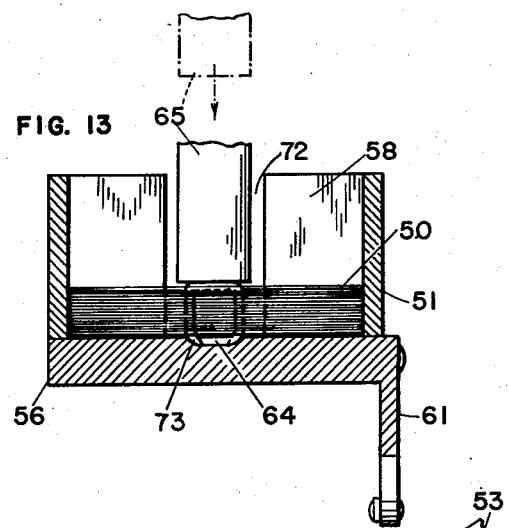
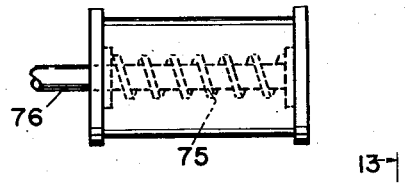
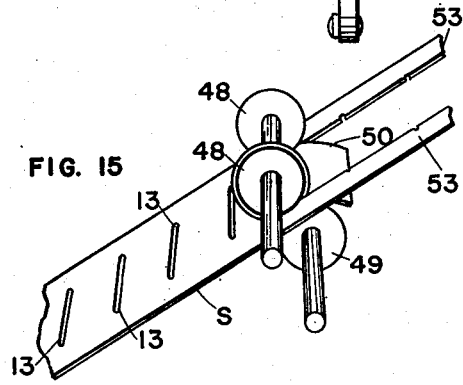
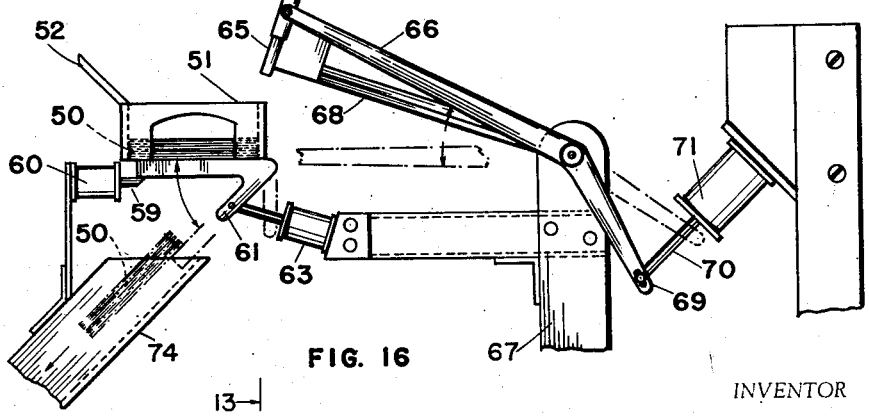
INVENTOR
THOMAS A. PATTY
BY *Stewart Blackburn*
ATTORNEY Dec. 22, 1953  T. A. PATTY  2,663,019
SHEET ASSEMBLING MACHINE
Filed Aug. 29, 1952  7 Sheets-Sheet 4
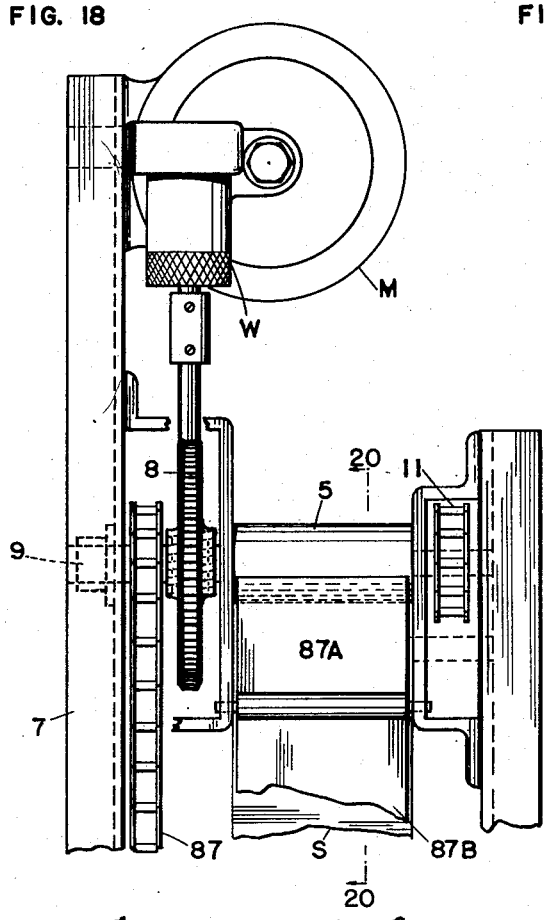
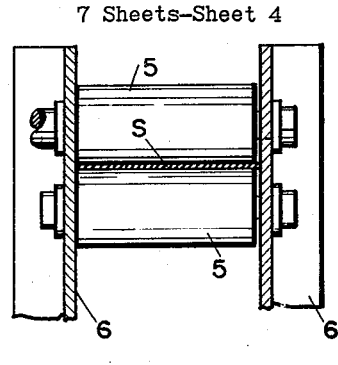
INVENTOR
THOMAS A. PATTY
BY
Stewart Blackman
ATTORNEY

INVENTOR
THOMAS A. PATTY

Dec. 22, 1953     T. A. PATTY     2,663,019
SHEET ASSEMBLING MACHINE
Filed Aug. 29, 1952     7 Sheets-Sheet 6
FIG. 22
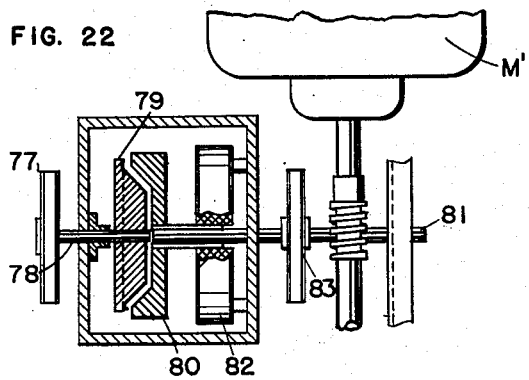
FIG. 23
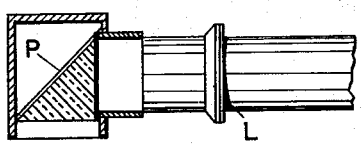
FIG. 25
FIG. 24
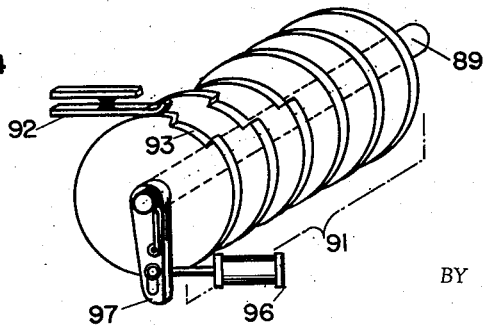
INVENTOR
THOMAS A. PATTY
BY
ATTORNEY Dec. 22, 1953      T. A. PATTY      2,663,019
SHEET ASSEMBLING MACHINE
Filed Aug. 29, 1952      7 Sheets-Sheet 7
FIG. 27
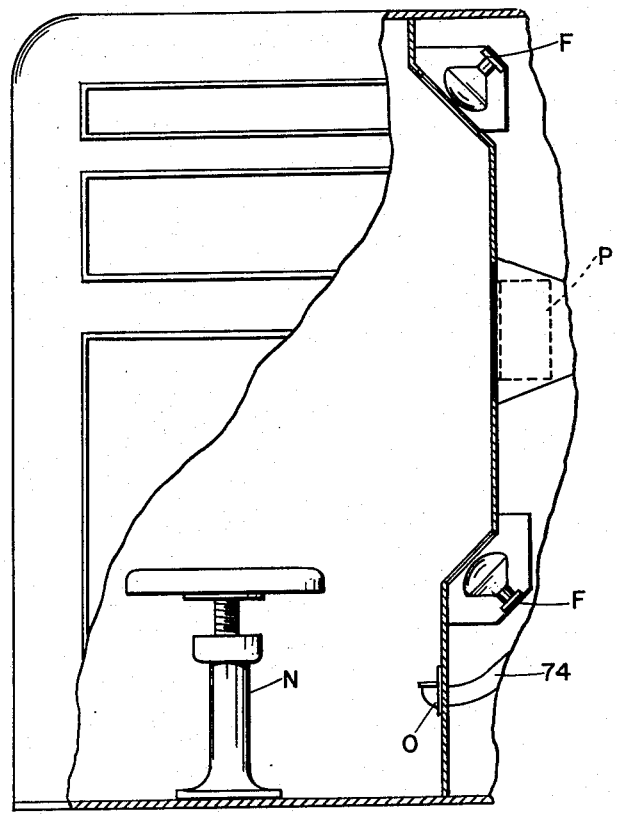
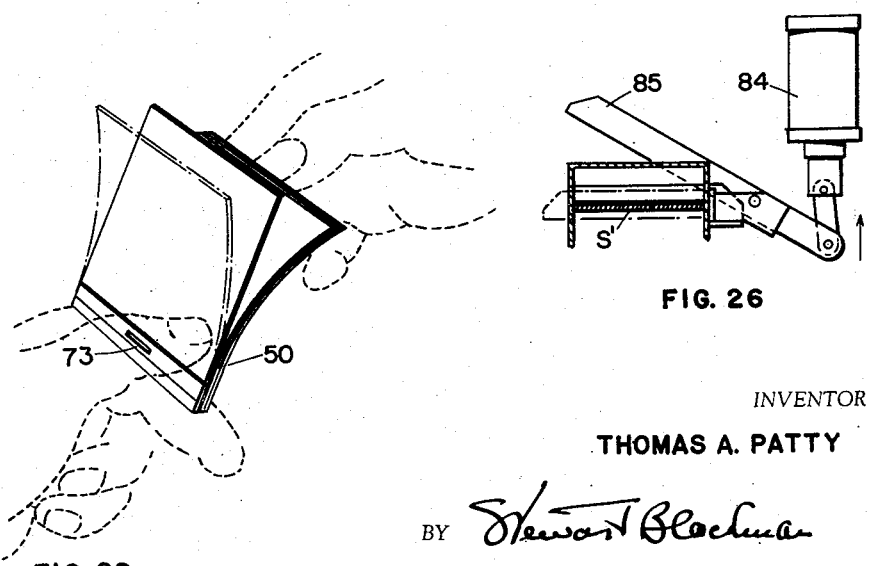
FIG. 26
FIG. 28
INVENTOR
THOMAS A. PATTY
BY *Stewart Blackman*
ATTORNEY Patented Dec. 22, 1953

2,663,019

UNITED STATES PATENT OFFICE 2,663,019

SHEET ASSEMBLING MACHINE

Thomas A. Patty, Miami, Fla.

Application August 29, 1952, Serial No. 307,049

8 Claims. (Cl. 1—8)

1

This invention relates to apparatus for feeding, cutting and trimming web or strip material of paper or flexible fabrics utilized in the production of united sheet assemblies such as pads, ticket or coupon blocks, and the like.

The apparatus to which the invention may be particularly applied has operative association, in function, with strip-imprinting machines, whether the printing be type- or photo-image impressed and references herein expressed to any of either species of imprinting machine will be understood merely to exemplify such functional, and not structural, association of the apparatus of the invention therewith.

It is one of the objects of the invention to provide an apparatus of the character and for the purposes described, which will be compact in assembly, capable of ready and economical manufacture, and simple and efficient in operation.

Other advantages of the invention will be discernible from the detailed description thereof hereinafter set forth.

The invention is embodied in the apparatus exemplified in the accompanying drawings in which the views are as follows, like reference numerals being understood to designate identical or analogous parts throughout the several views:

Fig. 1, a diagrammatic elevation in partial section, with parts broken away for clarity, of one adaptation of the invention;

Fig. 2, a plan, in part, of the strip-conducting track; and

Figure 5:
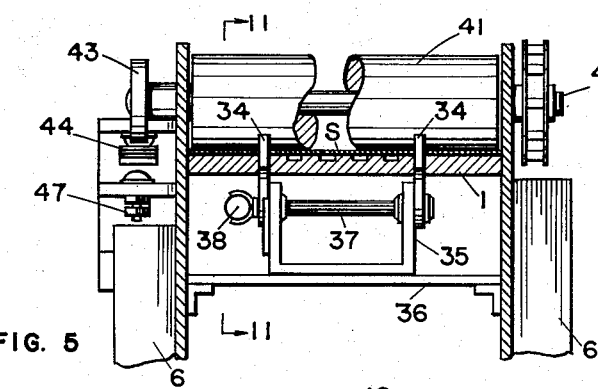
Figure 6:
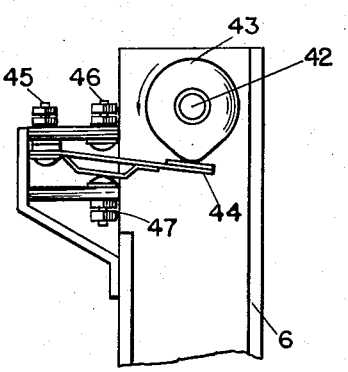
Figure 7:
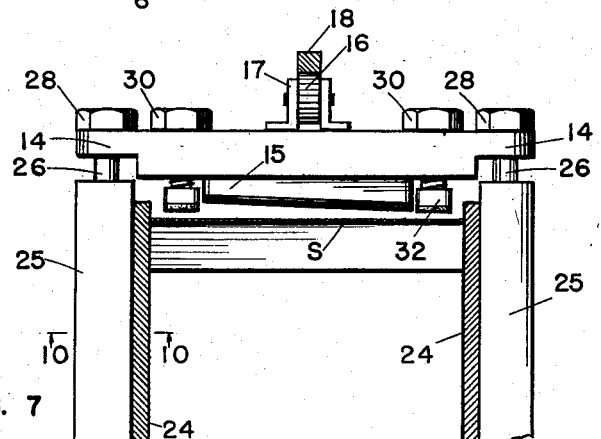
Figure 8:
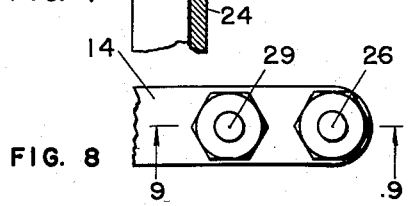

Fig. 3, a typical transverse vertical section therethrough;

Fig. 4, a section on line 4—4 of Fig. 2;

Fig. 5, a section on line 5—5 of Fig. 11;

Fig. 6, a left end elevation of the view shown in Fig. 5;

Fig. 7, a section on line 7—7 of Fig. 11;

Fig. 8, a fractional plan of an end portion of the cutter head and

Figure 10:
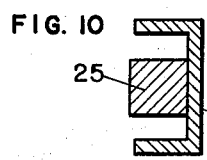
Figure 9:
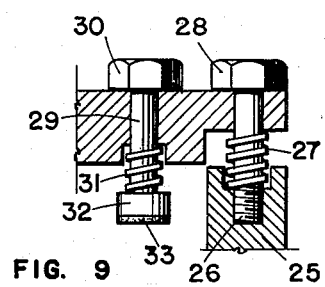
Figure 21:
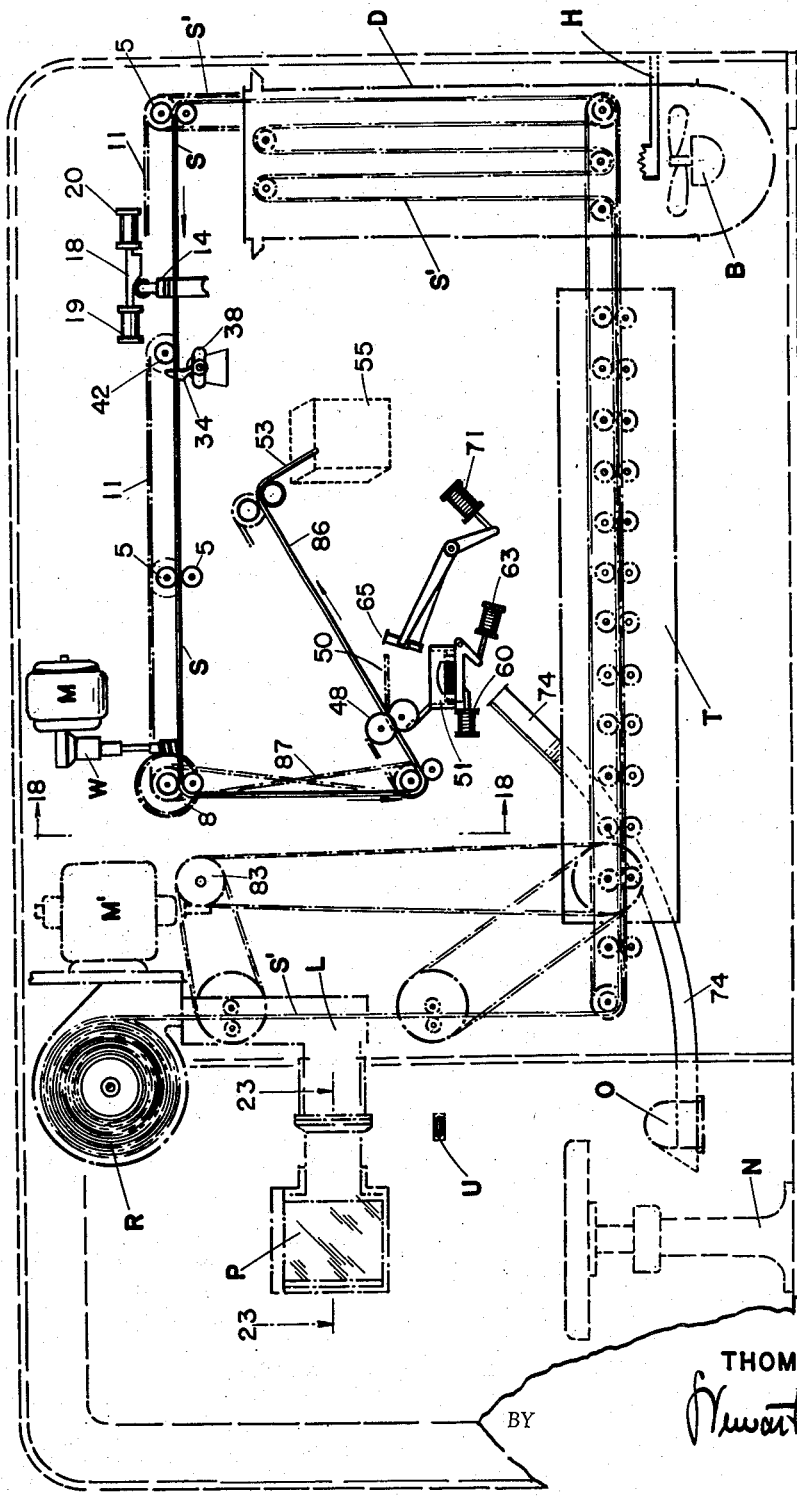

Fig. 9, a section on line 9—9 of Fig. 8;

Fig. 10, a section on line 10—10 of Fig. 7;

Fig. 11, a section on line 11—11 of Fig. 5;

Fig. 12, an isometric view of a stacking bin shown in Figs. 16 and 21, and

Fig. 13, an enlarged section therethrough on line 13—13 of Fig. 16;

Fig. 14, a typical solenoid structure;

Fig. 15, a perspective of the trimming wheels in relation to the strip cut thereby;

Fig. 16, an elevation of the stapling and dispensing mechanisms;

Fig. 17, a transverse sectional elevation of a typical roller mounting;

2

Fig. 18, an elevation taken from line 18—18 of Fig. 21 of the strip propulsion driving assembly;

Fig. 19, a fractional plan thereof;

Fig. 20, a sectional elevation of the strip deflectors taken on line 20—20 of Fig. 18;

Fig. 21, a diagrammatic elevational view of the invention in strip-receiving relation with a photo-image printing machine of known type;

Fig. 22, a fragmentary sectional elevation of a magnetic clutch drive mechanism;

Fig. 23, a section on line 23—23 of Fig. 21;

Fig. 24, an isometric projection of the control cam block, and

Fig. 25, a wiring diagram of a suitable control for the automatic operation of the invention in common with the imprinting machine served thereby;

Fig. 26, a magnetically-operated severing knife;

Fig. 27, an end elevation, partly broken away, of the view shown in Fig. 21; and Fig. 28, a perspective view of a block of sheets produced by the invention and united and dispensed thereby.

The apparatus of the invention comprises the usual track for conducting the imprinted strip received as at S' (Fig. 1) from the printing machine, and suitable supporting structure to carry the track, a typical cross-sectional view of which is depicted in Fig. 3. The strip, now in passage through the apparatus and designated S, is supported for travel on a bed plate 1, the sides of which may be bracketed by angle members 2 to a pair of outer side rails 3. These rails terminate at the top thereof in inwardly extending flanges 4 which overlie the side marginal edges of the strip and are spaced therefrom to provide a pair of side grooves in which the strip is freely movable through the apparatus.

The strip is propelled in the usual manner, by a plurality of rollers 5 in frictional engagement therewith and journaled at each end in a pair of upright posts or channels 6 which form a part of the track supporting structure. The size and arrangement of these upright members and their associated braces and the like will be understood to vary with the shape and conformation of the particular adaptation which the apparatus of the invention undergoes to meet the structural arrangement of the printing machine served thereby. Motive power for the roller assemblies may be derived from a fractional horsepower motor M, carried by suitable channel members 7, and driveably connected with a worm gear 8 mounted on a shaft 9, through intervening reduction transmission structure shown generally at W. The shaft 8, on which is mounted one of the upper rollers, is rotatable by a sprocket 10 over which is passed a chain 11 in meshing engagement with like sprockets 12, mounted on the shafts of other rollers in the train whereby the strip is advanced in the direction of the arrow (Fig. 1).

Interposed in the path of the strip, is a slotting mechanism which functions to cut a transverse slot 13 at uniform intervals therealong (Figs. 2 and 15).

The slotting mechanism (Figs. 5 to 15) comprises a cutter head 14 in the bottom face of which is secured a cutter 15, extending crosswise of the strip and spaced thereabove, the cutter being shaped to the die to which the slots are cut. Arranged on the cutter head is a follower consisting of a roller 16, rotatable in a pair of trunnions 17 fastened to the top face of the cutter head. The follower is engageable by an overhead cam 18 which forms the common core of a pair of opposed solenoids 19 and 20, secured in any suitable manner to adjacent framing structure, as at 21. The cam 18 is reciprocable upon the alternate energization of the solenoid coils to depress the roller 17 and cutter head thereunder, whereby to perforate the strip S (Fig. 7) which passes over a die block 22. This block has a complementary channel 23 adapted to receive the cutter 15, and may be welded at each end thereof to adjacent framing members, as the upright channels 24.

Against the outer web faces of the channels 24, is formed a pair of rectangular posts 25, each of which has threaded into the top thereof, an upstanding cylindrical stem 26 passed loosely through the cutter head 15 thereabove. Coiled around each of these stems, is a helical spring 27 upon which the cutter head is resiliently supported to cushion the impact thereof on its downward stroke. A nut 28, threaded on the top end of the stem, is turnable to adjust the tensions of springs 27 and the spacing of the cutter in relation to the strip thereunder.

The cutter head has arranged adjacent each end thereof, a pair of loosely fitted plungers 29 passed vertically therethrough and terminating at the top thereof in a pair of adjusting nuts 30 threaded thereto. These plungers each have a helical spring 31 coiled therearound, adapted to bear at one end against the bottom of the cutter head and at the opposite end against a cylindrical shoe 32 carried at the bottom of each plunger. These shoes have a bottom facing of non-marring material 33.

Upon a downward stroke of the cutter, the shoes 32 are brought into momentary engagement with the strip S, arresting the movement thereof to permit the cutter to complete perforation of the slot 13 therethrough.

The solenoids 19 and 20 may be energized through an electrical circuit more specifically shown in the wiring diagram (Fig. 25) but governed by two switches, one of which is actuated by the advancing strip and the other, by a cam wheel rotatable with one of the rollers and having the same R. P. M. As illustrated in Figs. 5 and 11, the strip-actuated switch consists of a pair of laterally-spaced, normally upright fingers 34 projecting above the bed plate 1, in the path of the advancing strip. The fingers are pivoted to a frame 35, supported by a cross-member 36 spanning the track therebelow, and connected by a shaft 37 which carries at one end thereof a small mercoid type tube 38. This tube, normally level, has the usual pair of terminals 39 which are bridged by the mercury content of the tube upon the tilting thereof. A small blade spring 40 is adapted to bear slightly against the fingers, exerting only sufficient force to barely maintain the fingers in upright position. A pressure roller 41, mounted on a shaft 42, is positioned to bear against the top face of the strip to assist the same in maintaining sufficient rigidity for the positive engagement of the fingers thereby, thus pivoting the fingers to tilt the mercoid tube as long as the strip is in transit thereover. The peripheral dimension of the pressure roller 41 equals the longitudinal interval between adjacent slots 13, i. e., one revolution of this roller advances the strip a distance equal to the interval between slots. The roller shaft 42 carries a cam wheel 43 mounted to intermittently engage and flex a spring leaf type of switch blade 44. This blade is in normal electrical contact with a pair of terminals 45 and 46 (Fig. 6) which it is adapted to bridge. When flexed by cam wheel 43, the blade breaks contact with terminal 46 to make contact with terminal 47, closing a circuit through terminals 45 and 47.

With the tilting of mercoid tube 38 (Fig. 25) one side of a power supply feeds through terminals 39, and when blade 44 is simultaneously depressed by cam wheel 43, this feeder connects terminal 45, to which it is led, with one terminal of solenoid 19 of which the other terminal is fed by the opposite side of the power supply, thus completing a circuit through solenoid 19 to retract its core, cam 18, to depress the cutter head assembly and perforate the strip. Upon the release of blade 44 by passage of the cam wheel therefrom, and the subsequent bridging of terminals 45 and 46, this feeder leads through these terminals for diversion to solenoid 20, being connected to one of its terminals of which the other is fed by the opposite side of the power supply, thereby energizing solenoid 20 to retract its core and reciprocate cam 18 for the elevation of the cutter head, as will be understood. Thus, the strip perforating cycle is repeated once in each revolution of roller 41 to effect the slotting of the strip during its passage over the fingers 34 which revert to their normally erect positions when the strip has cleared these fingers. The energizing circuit through solenoid 19 remains broken by virtue of the return of the mercoid tube to its normally level position until passage of another strip through the slotting station.

Further interposed in the path of the advancing strip are two pairs of trimming wheels arranged in an upper pair 48 and a lower pair 49 (Figs. 1 and 15), the operation of which is fully described in U. S. patent to Tuttle et al., No. 1,957,863. These cutting members trim the strip along the marginal sides thereof along lines which intersect the slots 13 at their extreme ends whereby to cut or trim out a sheet or frame 50. Each individual sheet 50 is thus dropped into a stacking bin 51 arranged on the under side of the track structure in receiving relation thereto, there being a forwardly inclined chute 52 extending from the rear wall of the bin to direct the sheets thereinto. The marginal side portions of the strip continue as ribbons 53 to travel upon shelf members 54 toward a suitable waste receptacle 55, positioned at the discharge end of the track structure.

The stacking bin has a bottom outlet, normally closed by a pivotable dump platform 56 (Figs. 12, 13 and 16), adapted to receive the sheets 50 in stacked relation thereon. This platform is hinged, as at 57, to the front wall 58 of the bin and locked in closed position by a retractible latch 59 forming the core 59 of a solenoid 60. The platform has a bell crank 61 formed thereon and linked by a core 62 of a solenoid 63.

Formed in the top face of the platform, adjacent the front edge thereof, is a clincher recess 64, and co-operating with the platform is a stapler having a stapling head 65 carried by a lever arm 66 pivoted to a suitable post or standard 67 (Fig. 16). The arm 66 terminates in a bell carnk 69, linked to the core 70 of a solenoid 71. When the solenoid 71 is energized, the head 65 strikes through a slot 72 formed in the front wall of the bin to clinch a staple through the stacked sheets 59 deposited on the platform (Fig. 13), the prongs of the staple 73 being received in the clincher recess 64. In timed relation with operation of the stapler, the solenoid is energized to retract latch 59, and solenoid 63 is energized to retract its core 62 to pivot the platform for the discharge therefrom of the block 50, a downwardly directed chute 74 receiving the block for delivery from the apparatus.

The stapler herein employed may be of any of the conventional types having a feed magazine 68 charged with a supply of staples for delivery to the head 65. However, I do not limit myself to a stapler of any specific design, and a type having a supply coil of stapling wire may be installed in the apparatus, the essential characteristic of such a device being that it shall have a stapling head 65 capable of receiving the staple and oscillable to strike the dumping platform to clinch the sheets therebetween.

Solenoids herein employed are known as the projected core type (Fig. 14), having suitable spring mechanism shown generally at 75 and adapted to urge the core member 76 into extended position, the core being retractible upon energization of the solenoid armature.

The invention is thus seen to be applicable, in practice, in functional association with a printing machine, from which the imprinted strip may issue with a succession of individual sheet areas, frames, or panels impressed thereon.

Such an imprinted strip may likewise be preslotted, either in the printed machine or as the blank strip therein introduced, in which event the slotting expedient herein described may be inactivated during the passage of the imprinted strip through the apparatus of the instant invention.

Proceeding, then, to Fig. 21, there is shown an imprinting machine of a known type in which the strip S' is impressed with successive panels through the photo-print process, the subject matter thereon being either of a person, an identification card, type-impressed text, or of any copyable embodiment known in the art.

These machines usually include a means to impress an image upon the strip, which may be of the type known as "positive print paper." The strip is passed through the conventional developing tank containing the necessary reversing, fixing and rinsing solutions, applied thereto in any manner known in the art, or the tank may employ any of the gaseous mediums available for this purpose. The exposed and developed strip is then passed through a drying chamber from which it is discharged for reception by the apparatus of the instant invention.

By association of my apparatus with the imprinting machine, this strip will be fed, trimmed and severed into a plurality of individual sheets or panels, and the panels stacked, fastened and dispensed in finished form, as of coupon or ticket blocks, cash memorandums, pictures and the like. The imprinting machine served by the instant apparatus is depicted in broken lines and the invention in full lines, like or analogous parts being designated by the reference numerals heretofore employed.

The strip S' is fed from a supply reel R, past the focal plane of a lens barrel L to which is directed a reflecting prism P having within its field of view a subject occupying a stool N and illuminated by flood lamps F (Fig. 27), of which subject the strp is to have a sequence of images imprinted thereon. The strip is advanced by the usual roller assemblies driven through intervening belt or chain drives and appropriate reduction gearing by a motor M'. The conventional shutter device (not shown) is included in such strip advancing means and a magnetic clutch to control the footage of strip exposed, when operating a single motor, may be of a type illustrated in Fig. 22. A camera drive pulley 77 having a belt-drive connection with the roller assembly passing the strip through the focal plane is fixed upon a shiftable shaft 78 on which is fixed a clutch-disk 79, normally out of engagement with a complementary disk 80 fixed upon a driven shaft 81 having reduction driving connection with the motor M'. Surrounding the shaft 81, is an electromagnetic coil 82, which is energizable to shift the disk 79 into frictional engagement with disk 80 thereby coupling shafts 78 and 81 together. By bringing this clutch into electrical circuit engagement from a master wiring control hereinafter set forth, a constantly driving motor may be employed to pass the unexposed portion of strip past the lens barrel and inactivate the camera drive means while continuing to advance the strip through subsequent operations of the machine, as will be understood, through the belt or chain driving connection effected from the pulley 83 which is fixed upon the constantly driven shaft 81. Means for severing the exposed portion of the strip from the unexposed portion thereof usually include a magnetically-operated knife (Fig. 26) arranged at the bottom of the lens barrel and an electric circuit to energize the solenoid 84 in timed relation to the passage of the strip whereby to pivot the knife 85 into severing relation therewith. Such circuit would be activated simultaneously with the de-activation of the camera drive pulley 77 heretofore described but is not further exemplified, being no part of the invention.

The exposed portion of the strip S' continues in travel through developing tank T and drying chamber D, emerging therefrom as the imprinted strip S which the apparatus of the instant invention is adapted to handle. The strip is now fed through the slotting and trimming stations for the disassociation therefrom of the sheets or panels as hereinbefore described, these being stacked, stapled and discharged through chute 74.

I prefer, in this embodiment of the invention, to terminate the strip-conducting track in a forwardly and upwardly inclined flight, as at 86, whereby to facilitate the falling of the severed sheets or panels in a more nearly level position, since each sheet has a tendency to drop at its foremost edge in advance of its rearmost edge. Preceding this terminal flight, the track is directed in a downward flight symbolized by the driving chain 87 whereby to reverse the direction of the strip's travel so as to bring the imprinted face thereof on the under side, the first sheet to be severed thus becoming the first sheet in the finished block. Figs. 18 and 20 illustrate a suitable deflector means for guiding the strip in its reversal in travel, there being a deflector 87A to direct the strip in downward travel and a deflector 87C to direct its ascent in the terminal flight, these deflectors being hinged to a plate 87B and held in operative positions by spring members arranged thereagainst, as at 87D.

It will be understood that the relative speeds of the strip's travel through the successive operations in the imprinting machine and the necessary expedients therefor, are not here described, since these do not form a part of the instant invention.

A common electrical control for the imprinting machine and the instant apparatus is illustrated in Fig. 25, employing a master timing device having an escapement mechanism as described in U. S. Patent No. 2,227,133 to Hall.

These timing devices have an electric clock motor shown symbolically at 88, which drives a cam shaft 89 through intervening escapement mechanism shown, generally, at 90. This shaft rotates a cam block (Fig. 24) as at 91, comprising a plurality of cams having intermittent engagement with a corresponding plurality of switch contact blades, as at 92. These contacts are broken by a gap sector 93 in each cam, remaining normally closed when the blades are flexed as illustrated in the drawing.

The speed ratios between cams, gap sector degree, and like control factors, are pre-determinable in a manner known in the art so as to effect the energization of the several circuits in timed relation to activate the corresponding mechanisms governed thereby. As viewed in Fig. 25, suffice it to point out that:

Power feeders 94 and 95 are led to a solenoid 96, the function of which is to initially rotate the cam block across the gap sector of the timer switch I, through a bell crank 97 to which the solenoid core is linked. This switch will be normally open following a prior operating cycle. The crank 97 has a pawl and ratchet assembly to idle the crank after the cam block has responded to the timer drive following the closing of switch I. One of the leads, 95, may be diverted through a coin-operated switch of known type having contacts at 98 which are closeable by the passage of a coin E down the chute U, to pivot an insulated blade member 99 toward closure of these contacts. Switch II closes to energize motors M and M', heating coil H, fan B, and flood lamps F. Switch III energizes the magnetic clutch advancing strip S' past the focal plane; switch IV activates the slotter mechanism; switch V, the stapler solenoid and switch VI closes to energize the stacking pin platform release and dump mechanisms circuit, by which the stapled block 59 is discharged to the chute 74 for delivery to an outlet O (Fig. 21).

The invention thus provides strip handling apparatus of novel and unique construction and assembly, meeting the objects thereof hereinabove announced.

The co-operative characteristic residing in the stacking and stapling of the panels or frames disassociated from the web or strip, as embodied in the stacking bin dumping platform and staple operating assembly, provides a simple and economical apparatus for forming, fastening and dispensing a united plurality of sheets, pages, frames or panels, imprinted upon a web or strip received from an imprinting machine.

Of course, the invention is susceptible of various modifications and changes without departing from the scope of the appended claims.

Having thus described the invention and the mode of its practice, what I claim as new and desire to secure by Letters Patent, is:

1. In an apparatus adapted to serve an imprinting machine and wherein a plurality of imprinted disassociated panels are formed, the combination of a track, a stacking bin arranged below said track and in panel receiving relation therewith, a stapling head in operative association with said bin, an oscillatory dumping platform having a clinching recess in the top thereof and forming a common bottom closure for said bin for the deposit of the disassociated panels in stacked relation thereon and a clinching block to receive the stapling impact of said head, means directing said head in descent upon the stacked panels to drive a staple therethrough, the prongs of said staple being received in said recess for the clinching thereof in compression between said platform and said head, and means pivoting said platform to discharge the stapled panels therefrom.

2. The invention as defined in claim 1 and: a retractible latch securing said platform in closed position, electrically operated means including a magnet and an electrical circuit for the energization thereof to retract said latch for the release of said platform to permit said pivotal discharging movement thereof.

3. The invention as defined in claim 1 and: said platform pivoting means comprising a crank connected to said platform, a solenoid having a normally projected core linked to said crank, and an electrical circuit to energize said solenoid for the retraction of said core to pivot said crank and said platform.

4. In an apparatus adapted to handle disassociated panels of sheet material, the combination of a stacking bin, a pivotable dump platform having a clinching recess in the top thereof and forming a bottom closure for said bin to receive said panels in stacked relation thereon, an oscillatory stapling head associated with said platform, electrically operated means including a magnet and an electrical energizing circuit therefor for pivoting said head to drive a staple through said panels, the prongs of said staple being receivable in said recess for the clinching thereof between said head and said platform, and means to pivot said platform to discharge the stapled panels therefrom.

5. The invention as defined in claim 4 and: a retractible latch securing said platform in closed position, electrically operated means including a magnet and an electrical circuit for the energization thereof to retract said latch for the release of said platform, said platform pivoting means comprising a crank connected to said platform, a solenoid having a normally projected core linked to said crank, and an electrical circuit to energize said solenoid in timed relation with the release of said platform for the retraction of said core to pivot said crank and said platform.

6. The invention as defined in claim 4 and: a retractible latch securing said platform in closed position, electrically operated means including a magnet and an electrical circuit for the energization thereof to retract said latch for the release of said platform to permit the discharging pivotal movement thereof.

7. The invention as defined in claim 4 and: said platform pivoting means comprising a crank connected to said platform, a solenoid having a normally projected core linked to said crank, and an electrical circuit to energize said solenoid for the retraction of said core to pivot said crank and said platform.

8. In an apparatus adapted to serve an imprinting machine for the reception therefrom of a succession of disassociated panels, the combination of a track, a stacking bin arranged in panel receiving relation to said track for the reception of the disassociated panels, a staple clinching block in association with said bin for receiving the disassociated panels in stacked relation thereon, and a stapling head operatively associated with said clinching block to direct a staple through the stacked panels, and means to discharge the stapled stack from said clinching block.

THOMAS A. PATTY.

References Cited in the file of this patent

UNITED STATES PATENTS

| Number | Name | Date |
|---|---|---|
| 2,177,675 | Sherman | Oct. 31, 1939 |
| 2,482,613 | Erickson | Sept. 20, 1949 |